United States Patent [19]
Keller et al.

[11] Patent Number: 5,196,258
[45] Date of Patent: Mar. 23, 1993

[54] WALL FOR AN AIR-SPRING BELLOWS

[75] Inventors: Michael Keller; Klaus Schreck, both of Hannover; Siegfried Dietrich, Hildesheim; Gerhard Thurow, Garbsen, all of Fed. Rep. of Germany

[73] Assignee: Continental Aktiengesellschaft, Hannover, Fed. Rep. of Germany

[21] Appl. No.: 755,821

[22] Filed: Sep. 6, 1991

[30] Foreign Application Priority Data

Sep. 8, 1990 [DE] Fed. Rep. of Germany ....... 4028601

[51] Int. Cl.$^5$ .......... B32B 7/10; B32B 25/08; D04H 3/12; D04B 1/18
[52] U.S. Cl. ................... 428/224; 428/246; 428/250; 428/252; 428/284; 428/286; 428/287; 493/940
[58] Field of Search ............ 428/246, 250, 252, 284, 428/286, 287; 493/940

[56] References Cited

U.S. PATENT DOCUMENTS

| | | | |
|---|---|---|---|
| 3,036,948 | 5/1962 | Danielson | 428/252 |
| 3,268,386 | 8/1966 | Osborne | 428/252 |
| 3,276,948 | 10/1966 | Gallagher | 428/252 |

Primary Examiner—Jenna L. Davis
Assistant Examiner—Kathryne E. Shelborne
Attorney, Agent, or Firm—Walter Ottesen

[57] ABSTRACT

The invention relates to a method for producing a vulcanizable composite material which can be dynamically stressed. The material is made of an elastomeric matrix having a reinforcement layer made of a textile fabric embedded therein. The fabric is prepared with an aqueous dispersion of synthetic resin and latex before being embedded in the elastomeric matrix and then dried. An adhesive interface coating is applied to the dried fabric with the coating being vulcanizable polar rubber present in an organic solution. The dried fabric provided with the adhesive interface coating is rubberized with a thin coating of rubber stock and embedded in the elastomeric matrix. An organic solution of toluene which contains chlorosulfonated polyethylene (CSM) as a vulcanizable polar rubber is used to apply the adhesive interface coating in order to produce a composite material which provides a good adhesion between the reinforcement layer and the elastomeric matrix even in the presence of high alternating flexural stresses.

3 Claims, 1 Drawing Sheet

WALL FOR AN AIR-SPRING BELLOWS

FIELD OF THE INVENTION

The invention relates to a method for producing a dynamically stressable vulcanizable composite material from an elastomeric matrix having a reinforcement layer made of textile fabric embedded therein. The fabric is treated with an aqueous dispersion of synthetic resin and latex and then dried before it is embedded in the elastomeric matrix. An adhesive interface coating is applied to the dried fabric with the adhesive coating being made of vulcanizable rubber present in an organic solution. The fabric treated in this manner is again dried. The dried fabric provided with the adhesive interface coating is rubberized with a thin coating of rubber stock and the rubberized fabric is then embedded in the elastomeric matrix.

BACKGROUND OF THE INVENTION

In the rubber industry, textile fabrics are used as reinforcement layers in the manufacture of products subjected to dynamic loads such as tires, conveyor belts and air springs. The durability of these products is dependent upon the adherence between the reinforcement layer and the elastomeric matrix.

Fabrics made of synthetic fibers such as nylon fibers are mostly used as reinforcement layers. Compared to natural fibers, these synthetic fibers have outstanding characteristics such as excellent performance with respect to alternating flexural stresses, high tear resistance and a uniform expansion capability. A disadvantage is seen in that the surface of the synthetic cords is smooth and not very compatible with rubber.

It is known to treat the fabric in advance of the application of rubber to obtain good adherence. For this purpose, the fabric is guided through a dip containing an aqueous two-component solution of synthetic resin and latex. Resorcinol formaldehyde is used in most cases as the synthetic resin solution while the latex is usually a vinyl-pyridine latex. The fabric prepared in this manner is then dried. A fabric treated in accordance with the above two operations will hereinafter be referred to as a "latexed fabric".

The latexed fabric is rubberized with a polar rubber stock such as polychloroprene rubber (CR) so that the fabric can be bonded well to the elastomeric matrix by vulcanization to form a whole.

U.S. Pat. No. 4,210,475 is incorporated herein by reference and discloses a method for treating tire cords to obtain a good rubber-to-cord adherence. Here too, an aqueous adhesive interface solution (dip) is utilized. In this method, the conventional resorcinol-formaldehyde resin is replaced with lignin sulfonate.

Although the methods described above and the interface adhesive systems have been proven, the increasing production requirements do not always permit a satisfactory service life to be obtained with products which are very highly stressed dynamically such as air springs in the area of motor vehicles. The high alternating flexural stress is the cause for a possible destruction of the particular rubber product with respect to the bond of the cord fabric and rubber.

SUMMARY OF THE INVENTION

It is an object of the invention to provide a method of the kind described above wherein a composite material is produced which also provides an excellent bond between the reinforcement layer and the elastomeric matrix under conditions of high alternating flexural stress.

The method of the invention is for producing a vulcanizable composite material which can be subjected to dynamic stresses. The method includes the steps of: treating a textile fabric in an aqueous dispersion of synthetic resin and latex; drying the treated fabric; applying to the dried fabric an organic solution of toluene containing chlorosulfonated polyethylene (CSM) as a vulcanizable polar rubber to form an adhesive interface coat on the fabric; again drying the fabric; rubberizing the dried fabric with a thin coat of rubber stock; and, embedding the rubberized fabric in an elastomeric matrix to form a reinforcement layer therein.

Thus, it is a feature of the invention to use an organic solution of toluene to apply the adhesive interface coating with the solution containing chlorosulfonated polyethylene (CSM) as a vulcanizable polar rubber.

The application of the additional adhesive interface coating to the latexed fabric can take place in a dip bath. The latexed fabric is wetted well since the polar rubber is present in organic solution. The polar rubber of the adhesive interface coating enters into a rubber-elastic bond with the latex of the first fabric treatment so that the transition of reinforcement to elastomeric matrix is smoother with respect to specific characteristics such as expansion. Because of the excellent wetting properties of the organic adhesive interface solution, a homogeneous bond between the cord fabric and the rubber stock applied as a skim coating is obtained.

After embedding the rubberized fabric in the elastomeric matrix, a composite material is provided from which the dynamically highly stressable products such as air springs for automobile suspensions can be made which have a high resistance to flexural stress.

The surprising improvement is produced by the condition that the chlorosulfonated polyethylene (CSM) of the organic adhesive interface solution bonds well to the latex of the latexed fabric.

On the other hand, the chlorosulfonated polyethylene (CSM) leads to an improved homogeneous bond with the surrounding applied skim coating of rubber stock. The polar rubber applied as chlorosulfonated polyethylene (CSM) leads to a high adhesion while at the same time providing a high resistance to flexural stresses of the bonding layers.

The higher polarity of the chlorosulfonated polyethylene (CSM) compared to the polarity of the vinyl-pyridine latex effects a higher bonding force. In addition, CSM is a polymer very resistant to sunlight and oxygen so that an advantageous protective layer is provided for the RFL-preparation which is not resistant to light.

According to another embodiment of the invention, the adhesive interface solution contains solid components such as soot and magnesium oxide. Soot provides for a black coloration and the magnesium oxide is a component of the vulcanizing system.

According to another embodiment of the invention, the additional adhesive interface coating is applied in a thickness of 3 to 5 micrometers.

The invention also relates to a composite material produced according to the method of the invention and comprises an elastomeric matrix and a reinforcement layer made of textile fabric embedded therein. The textile fabric can be especially a fabric made of synthetic polymers having fabric threads impregnated with an aqueous dispersion of resorcinol-formaldehyde resin and vinyl-pyridine latex whereafter the fabric threads are dried. The fabric threads have a second dried coating made of an organic solution of vulcanizable polar rubber and dispersed solids. This composite material is characterized in that the second coating comprises toluene with chlorosulfonated polyethylene (CSM) dissolved therein. Such a composite material is especially well suited to the production of dynamically highly stressable products such as conveyor belts, tires and air-spring bellows which are vulcanized in accordance with their fabrication.

The invention also relates to an air-spring bellows made of a composite material produced according to the method of the invention. The composite material has two reinforcement layers embedded in an elastomeric matrix comprising an inner rubber layer and an outer rubber layer. The fabric threads of the reinforcement layers are latexed and have a coating of an organic adhesive interface solution as well as an intermediate rubber. The air spring is characterized in that the second coating comprises an organic solution containing polar rubber with the coating being arranged between the first coating and the surrounding rubber.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
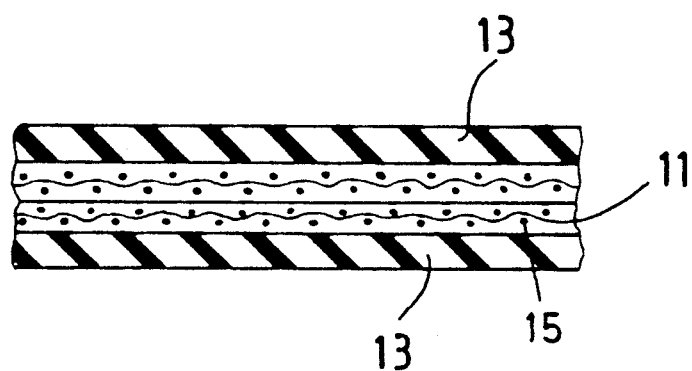
FIG. 1 is a side elevation view, in section, of a portion of a band-like product made of an elastomeric composite material; and, FIG. 2 shows, in longitudinal section, an individual fabric thread of the reinforcement layer of the band-like product shown in FIG. 1.

A nylon cord fabric is pulled through an aqueous solution of resorcinol formaldehyde and vinyl-pyridine (VP) latex in a dip bath. After drying the coating obtained in this manner, the latex fabric is passed through a second dip bath containing a solution of CSM-rubber and dispersed solids in toluene.

The solution of the second dip bath has the following constituents:

10 parts chlorosulfonated polyethylene (CSM)
5 parts epoxy resin
1 part hardener (polyamine type
4 parts magnesium oxide
2 parts soot
78 parts toluene A second drying process takes place after saturation of the fabric.

The fabric sheeting provided with the two adhesive interface coatings is then rubberized on both sides with respective rubber stock coatings to even out fabric interstices with this step being carried out on a three-roll calender. Cover coatings 13 of rubber are applied to the rubberized fabric 11 in two layers on both sides thereof in a calender.

Figure 2:
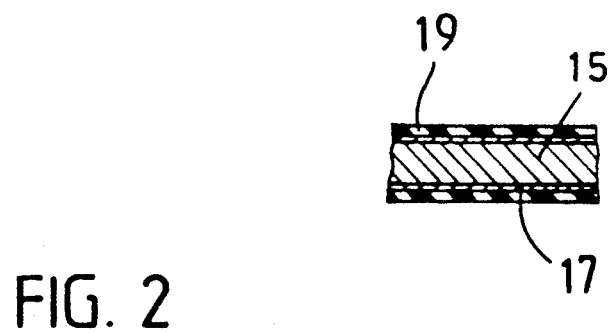

A single nylon thread 15 is shown schematically in FIG. 2 in order to more clearly show the treatment of its surface. The surface of thread 15 is provided with a first coating 17 of resorcinol formaldehyde and vinyl-pyridine latex with the coating 17 being applied in advance of the processing of the fabric 11 in the first dip bath. A second coating 19 of CSM-rubber and dispersed solids is present on the first coating 17. This second coating 19 is applied by the treatment of the fabric 11 in the second dip bath.

It is understood that the foregoing description is that of the preferred embodiments of the invention and that various changes and modifications may be made thereto without departing from the spirit and scope of the invention as defined in the appended claims.

What is claimed is:

1. A wall for an air-spring bellows subjected to flexural stress during use, the wall comprising:
    an elastomeric matrix including an inner rubber layer and an outer rubber layer;
    two mutually adjacent reinforcement layers embedded in said elastomeric matrix; and,
    each of said reinforcement layers including a textile fabric of synthetic polymers having fabric threads impregnated with an aqueous dispersion of resorcinol formaldehyde resin and vinyl pyridine latex and thereafter dried to define a first adhesive interface coating;
    each of said reinforcement layers further including a second adhesive interface coating applied over said first adhesive interface coating and being made from an organic adhesive interface solution containing a vulcanizable polar rubber; and a skim coating made of rubber stock and applied to said second adhesive interface coating made from said organic adhesive interface solution.

2. The wall of claim 1, wherein said polar rubber is chlorosulfonated polyethylene.

3. The wall of claim 1, said second adhesive interface coating having a thickness of 3 to 5 micrometers.

* * * * *